Feb. 19, 1935.  W. LA HODNY ET AL  1,991,363
BRACKET FOR MIRRORS OR THE LIKE
Filed Sept. 5, 1933   4 Sheets-Sheet 1

INVENTORS
William La Hodny
and William J Szyminski
BY
Popp and Powers
ATTORNEYS

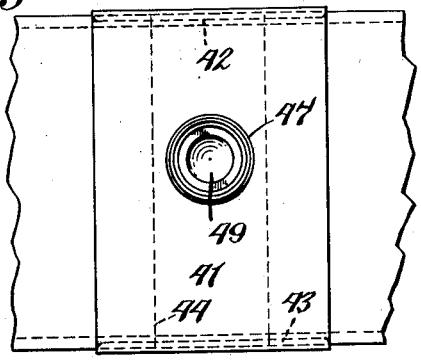
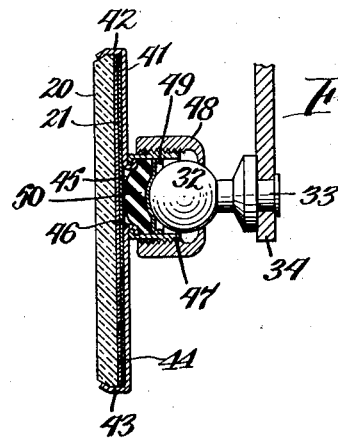
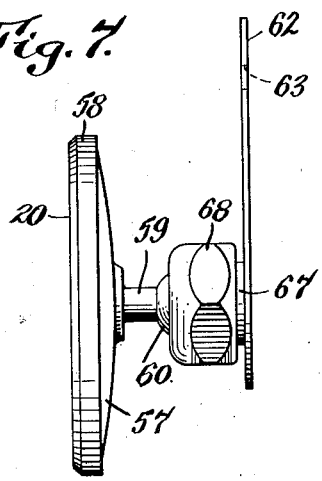
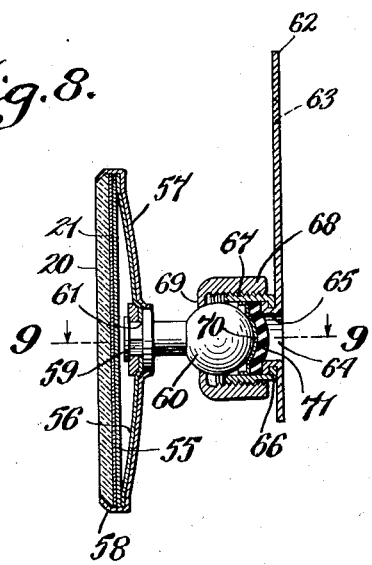
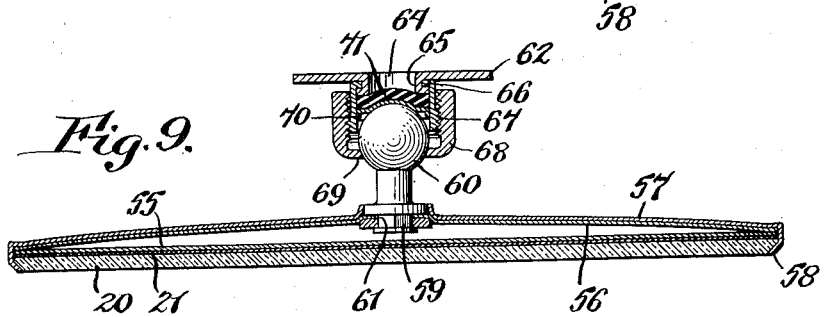

Feb. 19, 1935.   W. LA HODNY ET AL   1,991,363
BRACKET FOR MIRRORS OR THE LIKE
Filed Sept. 5, 1933   4 Sheets-Sheet 3
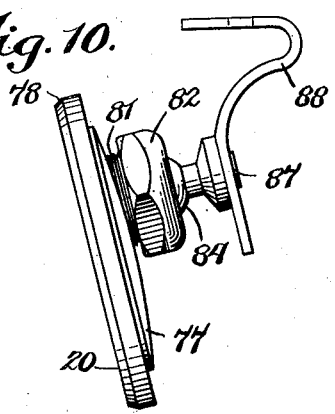
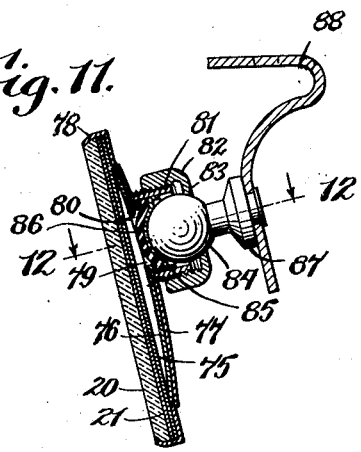
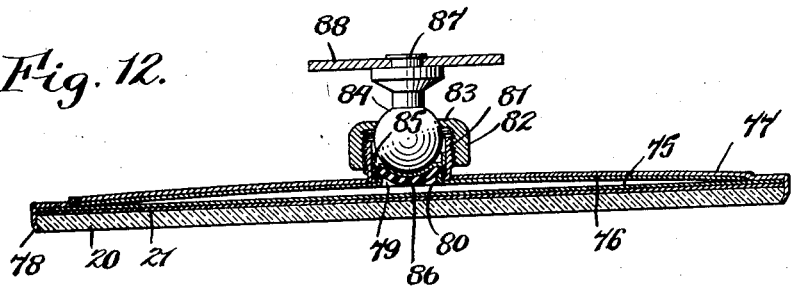
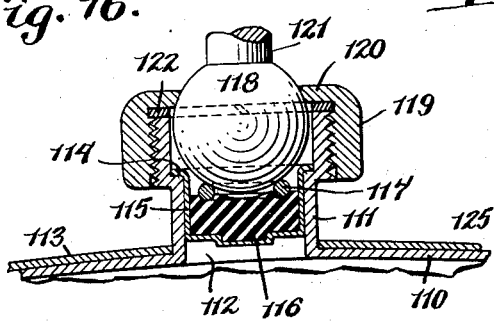
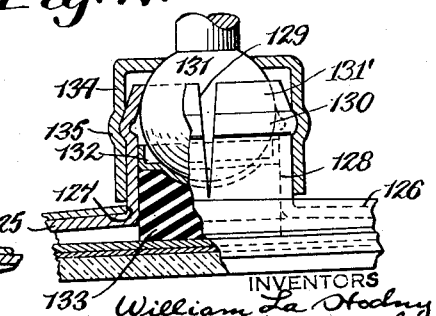
INVENTORS
William La Hodny
and William J. Szyminski
BY
Pogye and Powers
ATTORNEYS

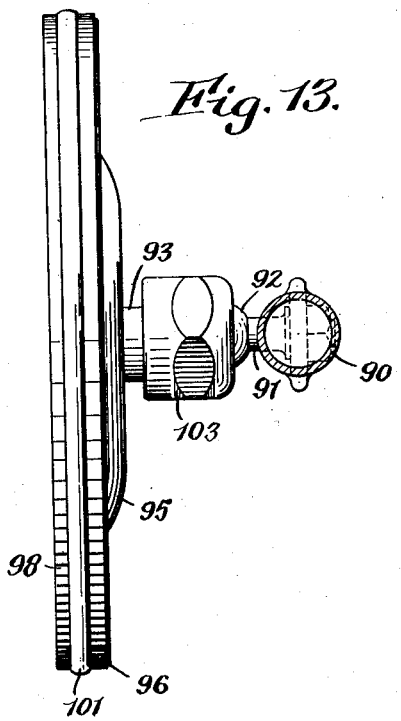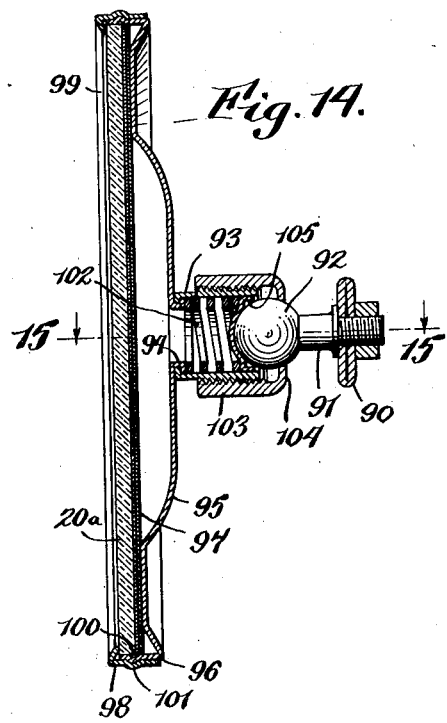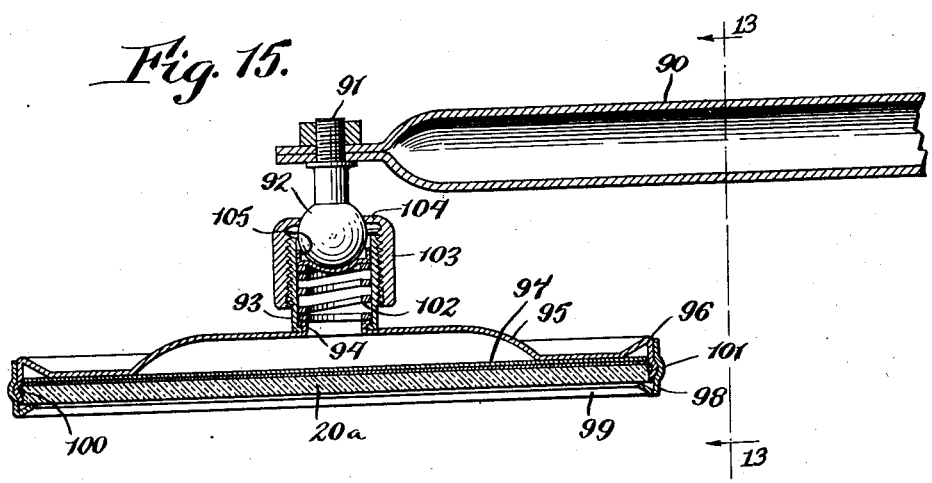

Patented Feb. 19, 1935

1,991,363

UNITED STATES PATENT OFFICE 1,991,363

BRACKET FOR MIRRORS OR THE LIKE

William L. Hodny, Buffalo, and William J. Szyminski, Lake View, N. Y., assignors to Standard Mirror Company, Inc., Buffalo, N. Y., a corporation of New York Application September 5, 1933, Serial No. 688,096

7 Claims. (Cl. 45—97)

This invention relates to a bracket for supporting a rear vision mirror or the like and more particularly to a universal mounting for supporting a rear vision mirror from the head bar of an automobile so that the driver can adjust the mirror to obtain a view of the road in rear of his automobile through the rear window of the car. This application is a companion to my co-pending application Ser. No. 668,056, filed April 26, 1933.

The principal object of this invention is to provide a rear vision mirror mounting which is neat and attractive in appearance, especially when viewed from the front through the windshield, and avoids the display of unsightly flanges, screws and other mechanical parts of rear vision mirror mountings, especially those parts which form a part of the universal connection between the supporting bracket and the mirror.

Another object is to provide such a mounting which can be produced at very low cost and is composed of but few inexpensive parts and is at the same time rugged and durable in construction and easily moved to any desired position about its universal joint.

Another object is to provide a rear vision mirror mounting in which the mirror and all parts are protected against accidental breakage and in which there is no danger of any of the parts becoming loose.

Another aim is to provide such a mirror mounting in which the tightening of the mirror to the bracket and the tightening of the universal joint to provide the necessary friction for resisting accidental displacement is accomplished by a single adjustment and in which the unsightly working parts are concealed.

Another object is to provide such a mirror mounting which can be readily adapted to be arranged at any place in the car, thereby permitting the invention to be employed under all conditions imposed by the designer of the automobile body.

In the accompanying drawings:

Fig. 5 is a fragmentary view, similar to Fig. 3, of the form of the invention shown in Fig. 4.

Fig. 6 is a vertical central section, similar to Fig. 2, of the modified form of the invention shown in Figs. 4 and 5.

Fig. 7 is a view similar to Figs. 1 and 4 and showing a still further modified form of the invention.

Fig. 8 is a view similar to Figs. 2 and 6 illustrating the form of the invention shown in Fig. 7.

Fig. 9 is a horizontal section, taken on line 9—9, Fig. 8.

Fig. 10 is a view similar to Figs. 1, 4 and 7 and showing a further modified form of our invention.

Fig. 11 is a vertical transverse section through the form of the invention shown in Fig. 10.

Fig. 12 is a substantially horizontal section, taken on line 12—12, Fig. 11.

Fig. 13 is a section taken on line 13—13, Fig. 15 through the supporting bar of another modification of our invention and showing the rear vision mirror mounting in elevation.

Fig. 14 is a vertical transverse section through the rear vision mirror and mounting shown in Fig. 13.

Fig. 15 is a horizontal section, taken on line 15—15, Fig. 14.

Fig. 16 is a horizontal fragmentary central section through a further modified form of our invention.

Fig. 17 is a fragmentary view similar to Fig. 16 showing a still further modified form of our invention.

Figure 1:
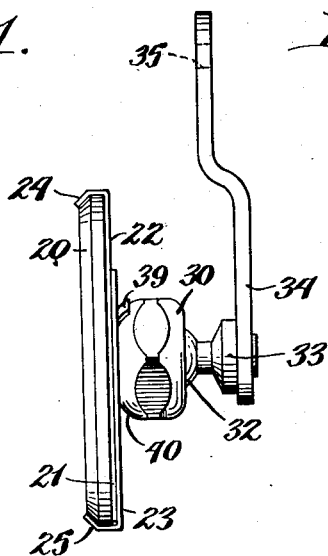
Fig. 1 is a side elevation of a rear vision mirror and mounting made in accordance with our invention.
Figure 2:
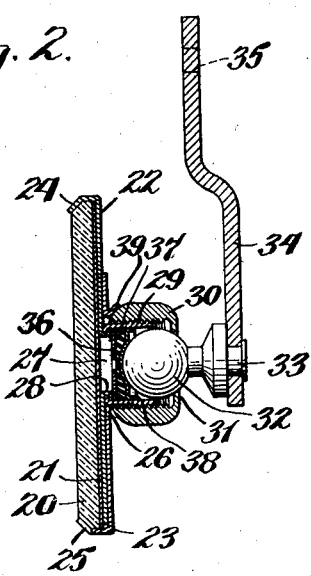
Fig. 2 is a vertical transverse section therethrough.
Figure 3:
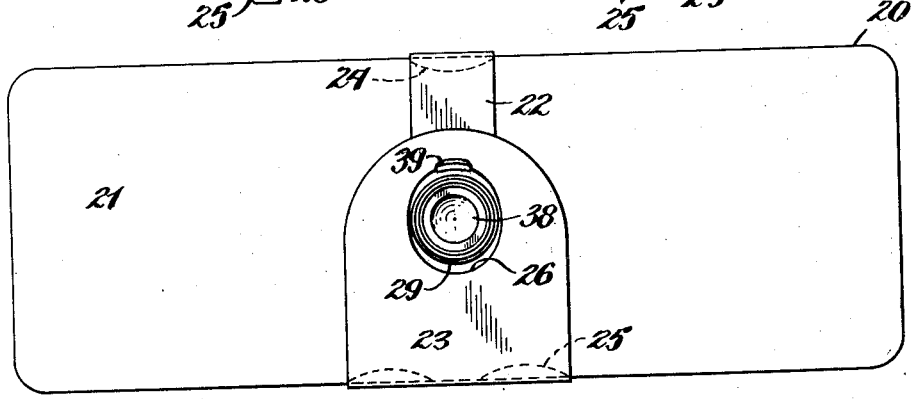
Fig. 3 is a vertical elevation viewed from the rear of the mirror, showing the bracket and ball support removed.

In the form of the invention shown in Figs. 1-3 the numeral 20 represents a rear vision mirror panel which can be of any suitable form but is preferably beveled and is provided on its rear side with the usual coating of silver 21 or other suitable reflective material. The mirror panel 20 is supported by two metal backing plates 22 and 23, the upper backing plate 22 being provided with a finger 24 which fits over the upper beveled edge of the mirror and the lower backing plate 23 being provided with two such fingers 25 which fit around the lower beveled edge of the mirror. The lower backing plate 23 is of larger area than the upper backing plate 22 and is slidably supported against the rear side of the upper backing plate 22 and is provided with a vertically elongated opening 26 which registers with the upper backing plate 22. The upper backing plate 22 is provided with a circular opening 27 which is of smaller diameter than the opening 26 in the lower backing plate 23 and is provided at its rim with a reversely formed flange 28 to which an open ended tubular shell 29 is attached, one edge of this tubular shell 29 being flanged inwardly to fit into the flange 28 of the upper backing plate 22, as best shown in Fig. 2.

The tubular shell 29 projects outwardly through the elongated opening 26 and at its outer end is provided with external threads on which a nut 30 is screwed. This nut, at its outer end, is provided with an inwardly extending flange 31 which is adapted to engage the adjacent face of a ball 32 so that when the nut 30 is screwed toward the mirror the mirror and ball are drawn together. The ball is provided with the usual stem 33 and this stem can be secured in any usual and well known manner to a bracket plate 34. The bracket plate 34 is provided with the usual screw holes 35 for attachment to the head bar (not shown) of the automobile windshield.

In order to provide the necessary friction for the ball joint, which friction permits the driver in the car to manually adjust the mirror to any desired angle but prevents accidental loss of adjustment, a washer 36 of fiber or the like is placed in the tubular shell 29 against the reversely formed flange 28 and in rear of this washer is placed a rubber disk 37 which is preferably dished inwardly at its center so as to fit the ball 32. In order to prevent displacement of the rubber disk and to relieve the friction against the ball 32 a cup shaped metal disk or washer 38 is interposed between the rubber disk 37 and the ball 32. This cup shaped metal disk preferably has marginal flanges which permit ready removal of the disk and at its center this disk is also preferably cupped so as to fit a substantial area of the ball, as best shown in Fig. 2. It is apparent that upon tightening the nut 30 the flange 31 of this nut draws the ball into a firm frictional contact with the metal disk 38 and that the rubber pad 37 provides a yielding cushion for the frictional ball joint so formed.

The tightening of the nut 30 is also employed to draw the two mirror backing plates 22 and 23 together, in a vertical direction, so as to securely clamp the mirror plate 20 between the fingers 24 and 25 of these plates. For this purpose the lower backing plate 23 is provided with a rearwardly projecting flange 39 which is formed integrally with the backing plate and is arranged at the upper edge of its elongated opening 26. This flange 39 is of curving form to fit the rounding front nose 40 of the nut 30. When the nut 30 is screwed to provide the necessary friction for the universal joint its rounding front nose 40 engages the underside of the flange 39 of the lower mirror backing plate 23 and thereby forces the lower backing plate 23 upwardly relative to the upper backing plate 22 so as to clamp the mirror plate 20 between the fingers at the upper and lower edges of these plates. The elongated form of the slot 26 permits a substantial adjustment of the mirror backing plates to accommodate mirror plates of varying heights.

Figure 4:
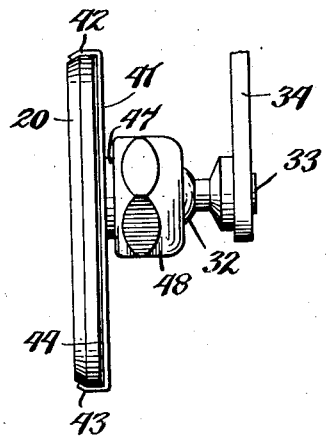
Fig. 4 is a side elevation, similar to Fig. 1, of a modified form of our invention.

In the form of the invention shown in Figs. 4, 5 and 6 the mirror plate 20 is backed by a single backing plate 41 to which the mirror plate can be secured in any suitable manner. As shown the backing plate 41 occupies the central part only of the mirror plate 20 and is provided with upper and lower flanges 42 and 43 which extend around the upper and lower beveled edges of the mirror, as best shown in Fig. 6. A strip of cardboard or paper 44 is also preferably interposed between the mirror plate and its metal backing plate 41 so as to prevent injury to the silvering 21 on the rear of the mirror plate. At its center the backing plate 41 is provided with an opening 45 which is provided with a rearwardly extending, reversely formed flange 46 at its margin. This flange is engaged by a tubular shell 47 which is similar to the tubular shell 29 of the form of the invention shown in Figs. 1–3 and is externally threaded to receive a nut 48, this nut having an inwardly projecting flange at its rear end which engages the rear face of the ball 32 in the same manner as the form of the invention shown in Figs. 1–3. The front face of the ball 32 presses against a cup shaped disk 49 which is similar to the cup shaped disk 38 in the form of the invention shown in Figs. 1–3 and a rubber disk or pad 50 is interposed between this disk 49 and the paper or cardboard backing sheet 44 of the mirror plate. With this form of the invention the tightening of the nut 48 to clamp the ball between this nut and the rubber backed metal disk 49 operates to adjust the friction of the ball joint and also presses the rubber disk against that portion of the mirror plate 20 which is arranged in front of the opening 46 so as to obtain a firm mounting for the mirror plate 20 in the metal backing plate 41. Therefore, as in the form of the invention shown in Figs. 1–3, the tightening of the adjustment nut secures the necessary friction for the ball joint and at the same time clamps the mirror in the metal backing plate or plates.

The form of the invention shown in Figs. 7, 8 and 9 illustrates a reversal of the universal joint as compared with the forms of the invention shown in Figs. 1–6, that is, the ball is carried by the mirror backing plate and the socket is carried by the supporting bracket. With this form of the invention the beveled mirror plate 20 is preferably backed by a piece of cardboard 55 which covers the entire silvered face of the mirror and the mirror plate is also backed by a rearwardly dished inner metal plate 56 which is made of relatively heavy gage metal and conforms to the outline of the mirror plate 20. The relatively heavy gage metal backing plate is secured to the mirror by an outer backing plate 57 which is made of relatively light gage metal and has its margins turned or spun, as indicated at 58 to embrace the registering edges of the mirror backing plate, cardboard backing and inner metal backing plate 56 and hold these edges together. The stem 59 of the ball 60 is secured to the relatively heavy gage inner metal backing plate 56 in any suitable manner and extends through an opening 61 in the light gage outer metal backing plate 57, the outer metal backing plate 57 being preferably flanged outwardly around this opening to fit against the stem 59 and provide a neat and attractive joint.

The supporting bracket 62 is provided with the usual holes 63 for screwing the assembly to the head bar (not shown) and at its lower end is provided with an opening 64 and around this opening a forwardly projecting channel shaped flange 65 is provided. The channel of this flange is adapted to receive the inwardly projecting flange 66 of an open ended tubular shell 67, this shell being externally threaded at its forward end to receive a nut 68. This nut has an inwardly projecting flange 69 at its front end which engages the front face of the ball 60 and adjustably presses this ball against a cup shaped metal washer 70 which is dished to conform to the ball. A rubber disk 71 is interposed between this cup shaped metal disk 70 and the channel shaped flange 65 of the supporting bracket, this rubber disk forming a yielding cushion for the frictional engagement of the ball 60.

In the form of the invention shown in Figs. 10–12 the mirror plate 20 is backed by cardboard backing 75 and by a relatively small heavy gage inner metal backing plate 76. An outer, relatively thin metal backing plate 77 is arranged outside of these parts, the edges of the outer metal backing plate being spun around the beveled edge of the mirror, as indicated at 78 so as to hold these parts together. The outer metal backing plate is provided with an opening 79 and the inner metal backing plate 76 is formed to provide a circular flange or neck 80 which projects through this opening 79 and forms an anchor for the externally threaded tubular shell 81 in the same manner as in the forms of the invention shown in Figs. 1–6. This tubular shell 81 receives a nut 82 having a flange 83 which presses the supporting ball 84 forwardly against a cup shaped metal washer 85. A rubber disk 86 is interposed between this cup shaped metal disk 85 and the neck or flange 80 so as to provide a cushion for the frictional ball joint. The ball 84 is provided with the usual stem 87 which is secured in any suitable manner to a supporting bracket 88.

In Figs. 13, 14 and 15 the invention is shown as adapted to truck mirrors in which the mirror is supported externally on the truck by a tubular supporting arm 90. To this arm 90 is connected the stem 91 of a ball 92, this ball fitting into a tubular externally threaded shell 93. The front end of the shell 93 is flanged inwardly to fit a central rearwardly extending neck 94 which is formed in a circular metal mirror backing plate 95. The margins 96 of this backing plate 95 fit around the periphery of a circular mirror plate 28, a circular cardboard backing 97 being interposed between the silvered side of the mirror plate 28 and its metal backing plate. The mirror plate is secured to the backing plate 95 by a metal rim 98 which has an inwardly projecting rim or bezel 99 engaged the front face of the mirror. The rim 98 is preferably secured to the periphery of the rim of the metal backing plate 96 by a bead 100 which snaps into a corresponding bead 101 on the rim 98.

Between the ball 92 and the neck 94 a helical compression spring 102 of square form in cross section is interposed and the frictional pressure exerted by this spring is adjusted by a nut 103 which is threaded on the cylindrical shell 93 and has a flange 104 at its rear end which engages the rear face of the ball 92 so as to draw the ball into the desired frictional engagement with the spring 102. In order to obtain proper frictional engagement between the spring 102 and the ball 92 a cup shaped metal disk 105 is interposed between this ball and its compression spring.

The form of the invention shown in Fig. 16 shows another form of universal mounting in which the mirror plate is backed by a relatively heavy gage inner metal backing plate 110 which is formed to provide an integral rearwardly projecting tubular neck 111, this neck projecting through an opening 112 of the light gage outer mirror backing plate 113. The backing plates 110 and 113 are secured to the mirror plate in the same manner as illustrated in Fig. 12. The neck 111 is formed to provide an internal annular shoulder 114 against which the rim of a metal cup 115 seats. This metal cup 115 houses a rubber disk 116 and also a metal ring 117 which is arranged against the rear side of the rubber disk 116. The supporting ball 118 extends into the tubular neck 111 and engages the metal ring 117. This ball is pressed against the metal ring and its rubber backing by a nut 119 having an inwardly projecting flange 120 engaging the rear side of the ball. The ball 118 is provided with the usual stem 121 by which it is attached to the usual supporting bracket (not shown). A split lock washer 122 is preferably also interposed between the end of the tubular neck 111 and the flange 120 of the nut 119 so as to prevent the nut 119 from accidentally loosening.

In Fig. 17 the form of the invention is illustrated in which the use of a threaded nut for adjustment of the friction imposed upon the ball and socket connection is avoided. In this form the mirror plate 20 is backed by an inner metal backing plate 125 of relatively heavy gage sheet metal and an outer backing plate 126 of relatively light gage sheet metal, the edges of which are spun over the margins of the inner metal backing plate and the mirror. The outer metal backing plate is provided with a central opening 127 through which a tubular neck 128 formed integrally with the inner metal backing plate 125 projects rearwardly. The tubular neck 128 is provided with V-shaped slits 129 and the split neck is also provided with an annular retaining bead 130. The supporting ball 131 for the mirror assembly is arranged in the split neck 128 and bears against the cup-shaped metal disk 132. Between this disk and the mirror plate a pad 133 of rubber is interposed. The rim 131' of the split neck 128 bears against the rear face of the ball 131 so that as the two halves of the split neck are pressed together the ball 131 is pressed forwardly into firm frictional engagement with the cup shaped metal disk 132 and a firm frictional assembly about the ball obtained by the rubber disk 133. To press the two halves of the split neck 128 inwardly a cap 134 is fitted over the split neck 128 and this cap is provided with an annular bead 135 which fits over the corresponding annular bead 130 of the split neck 128 so that the cap is held in position.

From the foregoing it is apparent that each of the forms of the invention shown provides an extremely attractive universal mounting for rear vision mirrors, the mechanical parts of which are substantially completely concealed. It is also apparent that the mounting can be assembled at low cost, particularly in the number of parts required in the mounting and the use of heavy gage metal where strength is required and light gage metal where it is desirable to spin or turn the metal over the edges of the mirror. It is also apparent that in each of the forms of the invention shown the mounting is extremely simple and inexpensive in construction and at the same time is rigid and durable and will provide a vibrationless mounting for the rear vision mirror which is at the same time capable of being readily turned to meet the requirements of the driver.

We claim as our invention:

1. Means for supporting a mirror or the like, comprising a supporting bracket, a bracket secured to the mirror, a ball connected to one of said brackets, a tubular socket receiving said ball and connected to and projecting outwardly from the other of said brackets and a tubular sleeve surrounding said socket, said sleeve being provided in its side intermediate its ends with a shoulder projection engaging a corresponding shoulder on the periphery of said socket to retain said sleeve on said socket and said sleeve being formed to retain said ball in said socket to exert frictional pressure thereon.

2. Means for supporting a mirror or the like, comprising a supporting bracket, a bracket secured to the mirror, a ball connected to one of said brackets, a tubular socket receiving said ball and connected to and projecting outwardly from the other of said brackets, a tubular sleeve fitting around said socket, said socket being provided with a circular bead projecting outwardly from its periphery and engaging a circular internal channel in said sleeve to retain said sleeve on said socket and said sleeve being formed to retain said ball in said socket and exert frictional pressure thereon.

3. Means for supporting a mirror or the like, comprising a supporting bracket, a bracket secured to said mirror, a ball connected to and projecting outwardly from one of said brackets, the other bracket being provided with an opening and being provided with a laterally projecting flange formed to provide a marginal U-shaped channel around said opening, an open ended tubular socket fitting at one end around said opening and flange and having a flange at its rim anchored in said channel, said socket receiving said ball, a yielding cushion in said socket and seated against the shoulder formed by said flange and yieldingly resisting relative movement of said ball and socket and a sleeve embracing the outer end of said socket and said ball and retaining said ball in said socket and pressing said ball against said rubber-like body.

4. Means for supporting a mirror or the like, comprising a metal backing plate for said mirror having means for grasping one edge thereof, another metal backing plate for said mirror slidably mounted against the outer face of said first metal backing plate and having means for gripping the opposite edge of said mirror, the outer metal backing plate being provided with an opening, a threaded projection secured to said inner metal backing plate and extending outwardly through said opening, a flange provided on said outer metal backing plate on the side of said opening opposite the mirror gripping portion of said outer metal backing plate, a nut screwed on said projection and having a rounded nose adapted to engage said flange and move said plates relative to one another to clamp the mirror between the gripping portions of the two metal backing plates and means for supporting said threaded projection.

5. Means for supporting a mirror or the like, comprising a supporting bracket, a ball carried by said bracket, a metal backing plate for said mirror having means at one edge for grasping one edge thereof, another metal backing plate for said mirror slidably mounted against the outer face of said first metal backing plate and having means for grasping the opposite edge of the mirror, the outer metal backing plate being provided with an opening, an externally threaded tubular projection secured to said inner metal backing plate and extending outwardly through said opening, a flange provided on said outer metal backing plate on the side of said opening opposite the mirror gripping portion of said outer metal backing plate, a cushion in the inner end of said tubular projection and forming a seat for said ball and a nut screwed on said projection and having a rounded nose adapted to engage said flange and move said plates relative to one another to clamp the mirror between the gripping portions of the two metal backing plates and said nut also having a portion adapted to engage said ball and hold it in frictional engagement with said cushion.

6. Means for supporting a mirror or the like, comprising a supporting bracket, a ball carried by said bracket, a metal backing plate for said mirror having means to embrace opposite edges of said mirror, said metal backing plate being provided with a rearwardly extending tubular extension receiving said ball, a cushion in said tubular extension and adapted to press on one side against said mirror to hold it tightly in said backing plate and on its opposite side against said ball to provide a frictional resistance to the relative movement of said ball and tubular extension and means at the outer end of said tubular extension for pressing said ball against said cushion and said cushion against said mirror.

7. Means for supporting a mirror or the like, comprising a supporting bracket, a ball carried by said bracket, a sheet metal bracket having its edges adapted to engage opposite margins of said mirror, a socket extension secured to said mirror bracket and housing said ball, a sleeve mounted on said socket extension and means actuated through motion derived from said sleeve for simultaneously clamping said mirror in its bracket and imposing a frictional resistance to the movement of said ball in said socket.

WILLIAM LA HODNY.
WILLIAM J. SZYMINSKI.